Figure 1:
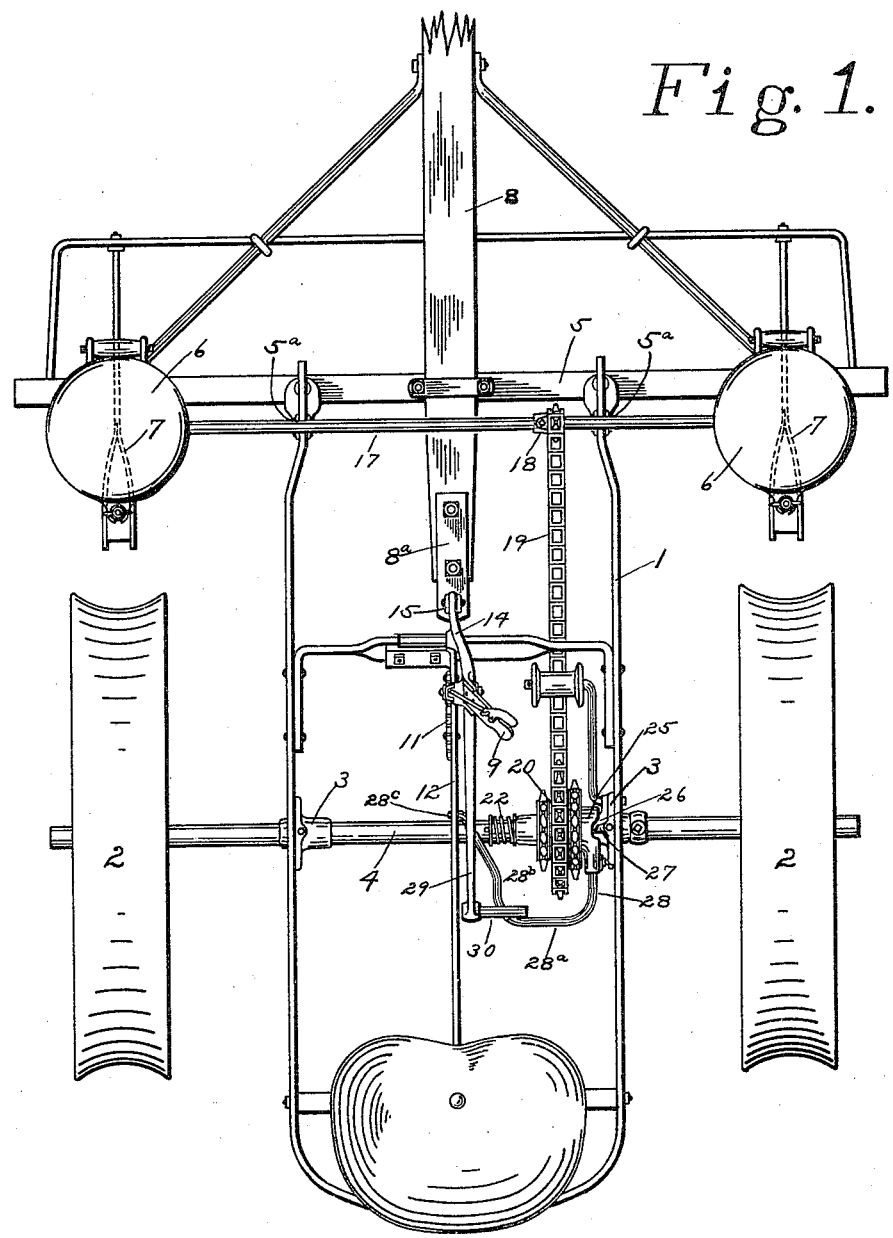

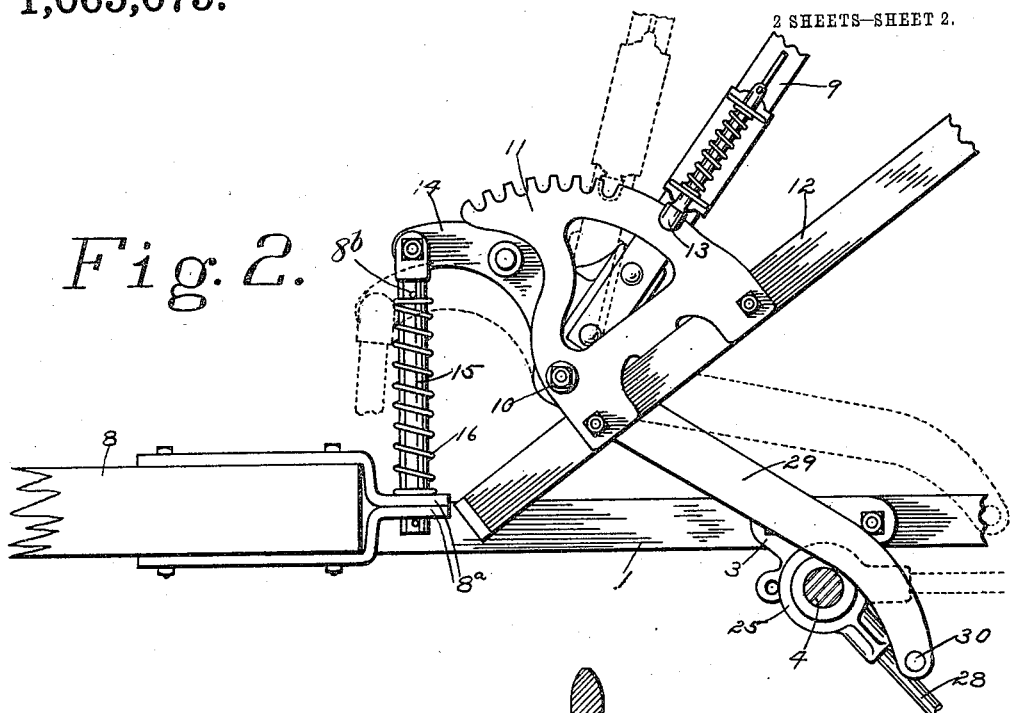
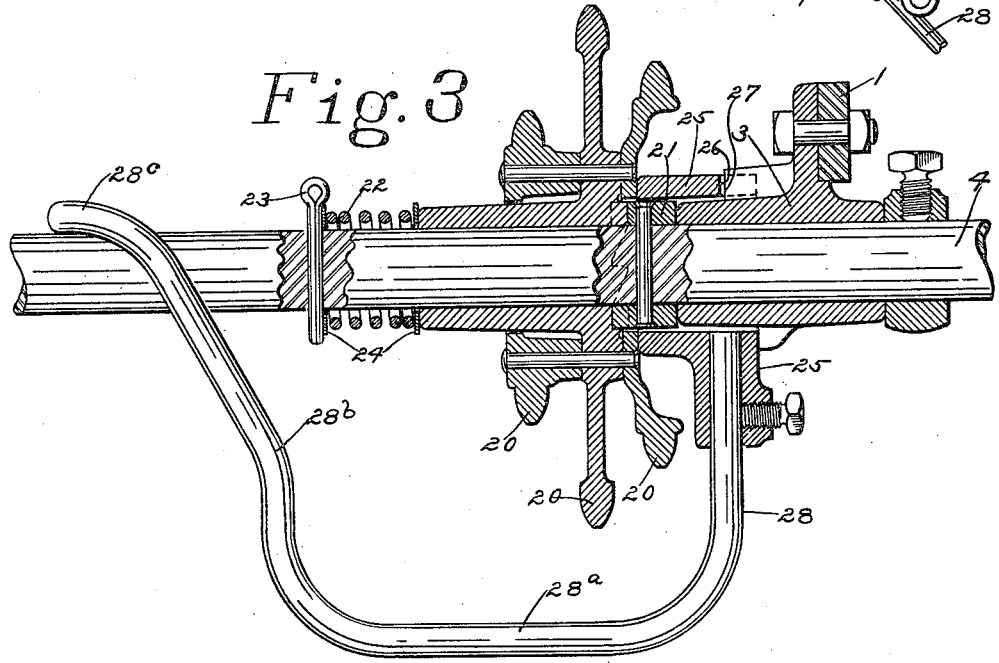

UNITED STATES PATENT OFFICE.

FRANK R. PACKHAM AND WILLIAM L. BRALEY, OF SPRINGFIELD, OHIO, ASSIGNORS TO THE AMERICAN SEEDING MACHINE COMPANY, OF SPRINGFIELD, OHIO, A CORPORATION OF OHIO.

CORN-PLANTER.

1,065,075.  Specification of Letters Patent.  Patented June 17, 1913.

Application filed September 16, 1912. Serial No. 720,607.

*To all whom it may concern:*

Be it known that we, FRANK R. PACKHAM and WILLIAM L. BRALEY, citizens of the United States, residing at Springfield, in the county of Clark and State of Ohio, have invented certain new and useful Improvements in Corn-Planters, of which the following is a specification.

This invention relates to improvements in corn planters and more particularly to those devices in a corn planter which operate to throw the seed dropping mechanism into or out of operation as the furrow openers are let into or lifted out of the ground.

It has been a common practice in a corn planter to provide for throwing the seed dropping mechanism out of operation whenever the furrow openers are raised out of the ground in transportation or in turning the machine in the field. Some of these throw-out devices require an independent operation aside from the lifting of the furrow openers, while others operate automatically in that the raising of the furrow openers automatically disengages the seed dropping mechanism from the driving mechanism. In the former manner of operation, time is lost and the operator frequently overlooks the throwing out of operation of the dropping mechanism when the furrow openers are raised, or the throwing into operation of the same when the furrow openers are lowered. For this reason the automatically operating throw-out devices are to be preferred, but as heretofore constructed, difficulty has been experienced in the successful operation of the same mainly through the fact that the front frame carrying the furrow openers has been utilized as a factor to perform the throw-out operation, and, owing to the fact that this front frame is pivotally connected to the rear frame, no absolute standard in the construction of the various parts embodied in the throw-out devices could be maintained, so that improper adjustment of the parts would cause a premature or tardy throwing in or out of the seeding mechanism, impairing the efficiency of the planter.

The object of this invention is to so arrange the parts of the throw-out devices that they will be maintained at all times in proper operative relation with each other so that the throwing in or out of the seeding mechanism will be accurately timed with the lowering or raising of the furrow openers.

A further object of the invention is to provide for allowing the front furrow opener carrying frame to have a limited movement independent of the throw-out mechanism so that when the lifting lever is latched up and the front frame allowed to "float," to conform to the inequalities of roughly surfaced ground, as is sometimes desirable, the throw-out devices will not be influenced by such floating movement of the front frame but the seeding mechanism will be maintained at all times in proper driving relation with the driving devices.

A further object of the invention is to provide for permitting the seeding mechanism to be thrown out of operation independently of any raising of the furrow openers.

A further object of the invention is to simplify the construction and make more effective the operation of devices of this character.

In the said drawings—Figure 1 is a plan view of so much of a corn planter as is necessary to illustrate this invention. Fig. 2 is a side elevation in detail of the lifting and lowering lever and some of the throw-out devices. Fig. 3 is a top plan of a portion of the axle showing the clutch mechanism in section thereon.

Like parts are represented by similar characters of reference in the several views.

In the said drawings, 1 represents the main frame; 2 the carrying wheels; and 3 the axle-boxes connected to the frame and in which the axle 4 is journaled, said axle being connected with the carrying wheels so as to revolve therewith in the usual way. Located in front of the main frame and pivotally attached thereto is an auxiliary frame 5, which carries in the usual way the seed hoppers 6 and furrow openers 7, which in the present case are in the nature of shoes or furrowing runners. This front auxiliary frame also has connected therewith in the usual way a tongue 8. The front auxiliary frame is pivotally connected to the rear main frame as at 5ª and means are provided for raising and lowering the same so as to raise or lower the furrow openers out of or into the ground. This raising and lowering means consists of a hand-lever 9, pivotally connected as at 10, with the toothed segment 11, secured to the seat support 12 and having the usual spring-pressed latch 13 to engage with any one of the notches to hold the lever in different positions of adjustment. The lever has a forwardly projecting arm 14 to the outer end of which is pivotally connected a rod 15, the lower end of which extends through an aperture in the straps 8ª connected to the rear end of the tongue 8, so that by throwing the lever to the rear, the front end of the main frame will be elevated, carrying with it to elevated position the auxiliary frame, thus raising the furrow openers from the ground. A spring 16 is interposed between the straps 8ª and a pin 8ᵇ on the upper end of the rod 15, for the purpose of placing a pressure upon the furrow openers when they are in their working position in the ground. The auxiliary frame carries the usual operating shaft 17, which drives the usual seed plates (not shown) in the hopper 6, this operating shaft being driven through the medium of the sprocket wheel 18 and chain 19 from any one of the series of connected sprocket wheels 20, which are loosely mounted upon the axle 4 and are adapted to be connected therewith through clutch faces located respectively upon the sprocket wheels 20 and the clutch collar 21 fast to the axle, said sprocket wheels being normally held in driving relation with said clutch collar through the medium of the spring 22 interposed between the hub of the sprocket wheels and the cotter pin 23 in the axle, washers 24 being employed to obviate friction when the sprocket wheels are at rest. As thus far described, the devices are of the usual construction found in corn planters of this type.

Our improved devices are as follows:— Located loosely about the axle-box 3 and the clutch collar 21, and in yielding contact with the sprocket wheels 20, is a cam ring 25 having a cam face 26, which cam face 26 is adapted to coöperate with the cam face 27 on the axle-box. Rigidly secured to the cam ring 25 is a finger 28 which extends rearwardly, thence laterally, as shown at 28ª, and thence forwardly as shown at 28ᵇ, its outer free end 28ᶜ being hooked over the axle 4 so that said axle will form a support for said finger. Projecting rearwardly and downwardly from the lower end of the lever 9 is an arm 29, having a laterally projecting pin 30 which lies over the said finger. The result of this construction is that as the lever 9 is thrown rearwardly to tilt the frames upwardly, the pin 30, striking the finger, rotates the cam ring 25, which, through the medium of the cam faces 26 and 27, forces the ring, and hence the sprocket wheels, laterally against the tension of the spring 22, thus disengaging the sprocket wheels from the clutch collar 21 so as to throw the operating shaft 17 out of driving relation with the axle. By this construction it will be seen that the devices which throw the seeding mechanism out of operation are all located upon the rear main frame, so that, after they are once properly adjusted, they will be maintained in the same relative position with reference to each other, thus insuring a uniform throwing out or in of the seeding mechanism, and that this operation in nowise depends upon the movement of the front auxiliary frame. It will also be seen that in the normal position of the devices, the pin 30 is located at a considerable distance above the finger 28, as shown in dotted lines in Fig. 2, so that when the latch 13 is held out of engagement with the segment and the auxiliary frame allowed to float, a limited movement of the auxiliary frame will be permitted without affecting in any way the throw-out devices. It will also be seen that the operator may, by placing his foot upon the finger 28, operate the throw-out devices without the necessity of elevating the auxiliary frame, which may be desirable where the auxiliary frame is "floating" or where it is desired to cease the seeding operation for a brief interval at places where the raising of the furrow openers is not necessary.

Having thus described our invention, we claim:—

1. In a corn planter, a main frame, an auxiliary frame pivotally connected to said main frame, seeding mechanism and furrow openers carried by said auxiliary frame, a rotatable axle journaled in said main frame, a sprocket wheel loosely mounted on said axle and having a driving connection with said seeding mechanism, clutch members between said sprocket wheel and axle together with means for normally holding the same in driving relation with each other, a lever on said main frame for raising and lowering said auxiliary frame, throw-out devices for disengaging said clutch members including a projecting finger one end of which is supported by said axle, and a projection on said lever coöperating with said finger to disengage said clutch members when said auxiliary frame is raised.

2. In a corn planter, a main frame, furrow openers pivotally connected with said main frame, seeding mechanism, a rotatable axle journaled in said main frame, a sprocket wheel loosely mounted on said axle and having a driving connection with said seeding mechanism, clutch members between said sprocket wheel and axle together with means for normally holding the same in driving relation with each other, a lever on said main frame for raising and lowering said furrow openers, throw-out devices for disengaging said clutch members including a projecting finger, one end of which is supported by said axle, and a projection on said lever coöperating with said finger to disengage said clutch mechanism when said furrow openers are raised.

3. In a corn planter, a frame, seeding mechanism, furrow openers pivotally connected with said frame, a rotatable axle journaled in said frame, a spring-pressed sprocket wheel loosely mounted on said axle and having a driving connection to said seeding mechanism, a clutch between said sprocket wheel and axle, a stationary cam connected with said frame, a movable cam on said axle coöperating with said stationary cam to unclutch said sprocket wheel, a projecting finger connected with said movable cam, a lever on said frame for raising and lowering said furrow openers, and a projection on said lever coöperating with said finger to disengage said sprocket wheel from said axle when the furrow openers are raised.

4. In a corn planter, a frame, furrow openers pivotally connected with said frame, a lever for raising and lowering said furrow openers, seeding mechanism, a rotatable axle journaled in said frame, a spring-pressed sprocket wheel mounted loosely upon said axle and having a driving connection to said seeding mechanism, clutch faces between said sprocket wheel and frame whereby said wheel is normally in driving relation with said axle, a movable cam ring, a finger projecting from said cam ring, the free end of said finger having a bearing on said axle, and a projection on said lever coöperating with said finger to disengage said clutch faces.

In testimony whereof, we have hereunto set our hands this 10th day of September 1912.

FRANK R. PACKHAM.
WILLIAM L. BRALEY.

Witnesses:
CLYDE A. BROWN,
CHAS. I. WELCH.

---

Copies of this patent may be obtained for five cents each, by addressing the "Commissioner of Patents, Washington, D. C."